US006953045B2

(12) United States Patent
Enerson

(10) Patent No.: US 6,953,045 B2
(45) Date of Patent: Oct. 11, 2005

(54) GAS DELIVERY SYSTEM

(76) Inventor: Neil Enerson, 5238 State Rd. 54, New Port Richey, FL (US) 34652

( * ) Notice: Subject to any disclaimer, the term of this patent is extended or adjusted under 35 U.S.C. 154(b) by 180 days.

(21) Appl. No.: 10/119,813

(22) Filed: Apr. 10, 2002

(65) Prior Publication Data

US 2003/0192609 A1 Oct. 16, 2003

(51) Int. Cl.[7] ............................ F17D 1/14; F16K 31/12
(52) U.S. Cl. ......................... 137/14; 137/334; 137/340; 137/487.5; 62/53.2
(58) Field of Search .............................. 137/487.5, 488, 137/334, 340, 14; 62/53.2

(56) References Cited

U.S. PATENT DOCUMENTS 3,516,429 A * 6/1970 Sandstede et al. ............ 137/87
3,690,115 A * 9/1972 Clayton ....................... 137/14
4,070,604 A 1/1978 Usry .......................... 318/203
4,139,019 A 2/1979 Bresie et al. ............... 137/351
4,380,242 A 4/1983 Bresie et al. ............... 137/113
4,417,312 A * 11/1983 Cronin et al. ............... 364/510
6,155,289 A * 12/2000 Carlsen et al. .............. 137/457
6,305,397 B1 * 10/2001 Ryder ...................... 137/487.5
6,339,996 B1 1/2002 Campbell .................... 114/74

* cited by examiner

*Primary Examiner*—A. Michael Chambers
(74) *Attorney, Agent, or Firm*—Woodard, Emhardt, Moriarty, McNett & Henry, LLP

(57) ABSTRACT

The present invention includes apparatus for linking a high-pressure gas source to equipment, so that the pressure can be reduced while maximum flow can be maintained. In one embodiment, the apparatus includes a motor valve, a control valve, a buffer tank, and an outlet regulator along a gas flow path. Controlling devices are associated with the motor valve and the control valve, and such devices respond pneumatically to pressure in the gas flow path to open or close those valves. The buffer tank operates provides sufficient volume associated with the flow path for stable sensing of pressure in the flow path, and to provide a medium for heat exchange resulting from the reduction in pressure. The apparatus may be mounted in a mobile carrier. In another embodiment, the apparatus includes a motor valve, a control valve, a line heater and an outlet regulator along a gas flow path. Controlling devices are associated with the motor valve and the control valve, and such devices respond pneumatically to pressure in the gas flow path to open or close those valves. The line heater provides a medium for heat exchange resulting from the reduction in pressure and to provide a lengthened gas flow path for stable sensing of pressure in the flow path. The apparatus may be mounted in a mobile carrier.

30 Claims, 5 Drawing Sheets

GAS DELIVERY SYSTEM

FIELD OF THE INVENTION

The present invention concerns generally the field of regulating high-pressure gases to accomplish maximum flow with reduction of pressure. Specifically, this invention concerns a regulating station useful in delivering such gases, for example compressed natural gas, to a customer.

BACKGROUND OF THE INVENTION

It is well-known to compress gases of all kinds, including elemental and other gases for scientific or industrial purposes, for transport and delivery to consumers or other customers. For example, it is known to compress natural gas and to transport the compressed natural gas (CNG) by truck, ship, or similar delivery system. As indicated in U.S. Pat. No. 6,339,996 to Campbell, there are users of natural gas that periodically require natural gas supply in excess of the supply available through existing pipelines. Further, there are areas in which natural gas service via pipeline is not available at all, due to remoteness, the high cost of laying pipelines, or other factors. In such cases, tanks of CNG transported by truck, for example, can be an economical way to provide the natural gas service required by such users.

To be economical, such tanks must be filled with large amounts of usable natural gas. Accordingly, full tanks of CNG are under very high pressure, commonly around 3000 pounds per square inch (psi). However, in many cases natural gas under considerably lower pressure, e.g. from 20 to 100 psi, is required. Consequently, unloading a CNG tank requires a substantial reduction in the gas pressure prior to being received at a customer's intake. Currently, that reduction takes a relatively long time, principally for two reasons. First, standard pneumatic regulators capable cannot reduce gas pressure at a high rate. Regulators that are capable of reducing pressure from 3000 psi to 100 psi must allow only a relatively small amount of gas through in a given time period in order to keep the downstream pressure stable. Second, according to the laws of chemistry a pressure decrease of a gas results in a proportional temperature drop, assuming constant volume. Allowing a large volume of CNG to be depressurized at once results not only in a great physical strain but also in a large temperature drop that can cause substantial damage to or malfunction of the CNG tank, valves, pipelines (particularly plastic or PVC pipes), customer equipment or other pieces of a natural gas system.

Users of large volumes of natural gas may require flow rates of 1000 cubic feet per hour (1000 cfh). At such rates, the cooling resulting from depressurization is considerable, as is the chance of significant or catastrophic failure if the pressure at the customer's intake is not stable and within the customer's specifications. Such failures could result in a loss of a substantial volume of gas through a relief valve that releases gas to atmosphere when pressure is too high. At worst, a failure could result in irreparable damage or destruction of equipment and/or explosion.

It is understood that there are electric or electronic devices, control valves, and/or pressure controllers that may be able to accept the high-pressure CNG, depressurize it, and pass it to a standard natural gas intake at a relatively high rate of delivery. Such devices are extremely expensive, however, reducing or eliminating the profitability of truck-delivery of CNG. Further, failures or other problems with such devices result in repairs or replacements that are quite expensive.

Accordingly, there is a need in the industry for a gas unloading system that is inexpensive, yet allows delivery of depressurized gas at a relatively high rate with proper safety.

SUMMARY OF THE INVENTION

In one embodiment, the present invention comprises a gas flow line including a motor valve, a control valve, and an outlet regulator, with the gas flow line having sufficient volume to permit pressure sensing. A controller is provided for controlling operation of said control valve, and first and second pilot lines connect an inlet regulator to the motor valve and the controller, respectively. The controller and the motor valve make adjustments in response to sensed pressure to maintain the pressure in the gas flow line at or below a predetermined maximum. The volume of the gas flow line may be provided by extending said gas flow line through a tank or by connecting the gas flow line to a buffer tank. The apparatus can include a land or water conveyance to provide mobility, and may be entirely pneumatic, i.e. the components do not require electricity to function.

In another embodiment, the invention comprises a gas flow line including a motor valve, a control valve, a means for heat exchange, and an outlet regulator. A controller for controlling operation of the control valve and first and second pilot lines connecting an inlet regulator to the motor valve and controller, respectively, are also provided. The controller and the motor valve make adjustments in response to sensed pressure to maintain the pressure in the gas flow line at or below a predetermined maximum. The means for heat exchange may comprise a buffer tank connected to the gas flow line or a tank including a heat exchanging medium external to the gas flow line.

In still another embodiment, the invention comprises a gas flow line including a motor valve, a control valve, a buffer tank, and an outlet regulator. A controller for controlling operation of said control valve and first and second pilot lines connecting an inlet regulator to the motor valve and controller, respectively, are provided. The motor valve and the control valve are adjusted in response to sensed pressure to maintain the pressure in the gas flow line at or below a predetermined maximum. The apparatus may be mounted to a portable cart, which may include wheels, rollers, casters and/or skids. The apparatus may further include a second buffer tank connected between the first regulator and the first and second pilot lines.

Yet another embodiment of the invention is a method comprising the steps of connecting a motor valve, a control valve, a buffer tank, and an outlet regulator to a flow line; connecting a first portion of said flow line to a source of gas; connecting a second portion of said flow line to an apparatus adapted to receive gas; and allowing gas to flow from said source of gas through said flow line to said apparatus adapted to receive gas. The method may also include gas moving past the motor valve, the control valve, the buffer tank, and the outlet regulator during the allowing step. The method may also include sensing the pressure in the flow line and adjusting at least one of the motor valve and the control valve in response to the sensing step.

In any embodiment, a second buffer tank may be connected between an inlet regulator and the first and second pilot lines. Other apparatus, such as meters that are pneumatically or electrically operated, may be connected to the gas flow line. One or more inlets and one or more outlets may be connected to the gas flow line for connection to a gas source and gas-using equipment, respectively. The inlet(s) are preferably adapted to connect to a high-pressure source of gas, and either inlet(s) or outlet(s) may have a flexible hose connected thereto. Preferably at least one inlet is connected to the inlet regulator and at least one outlet is connected to the outlet regulator. The apparatus can be mounted to a portable cart or other conveyance for ease of use. In one embodiment, the cart could include one of wheels, rollers, casters and skids whereby the cart can be moved.

Other features of the invention and its advantages will be understood by one of skill in the art by reference to the accompanying specification and drawings.

DESCRIPTION OF THE PREFERRED EMBODIMENT

Figure 1:
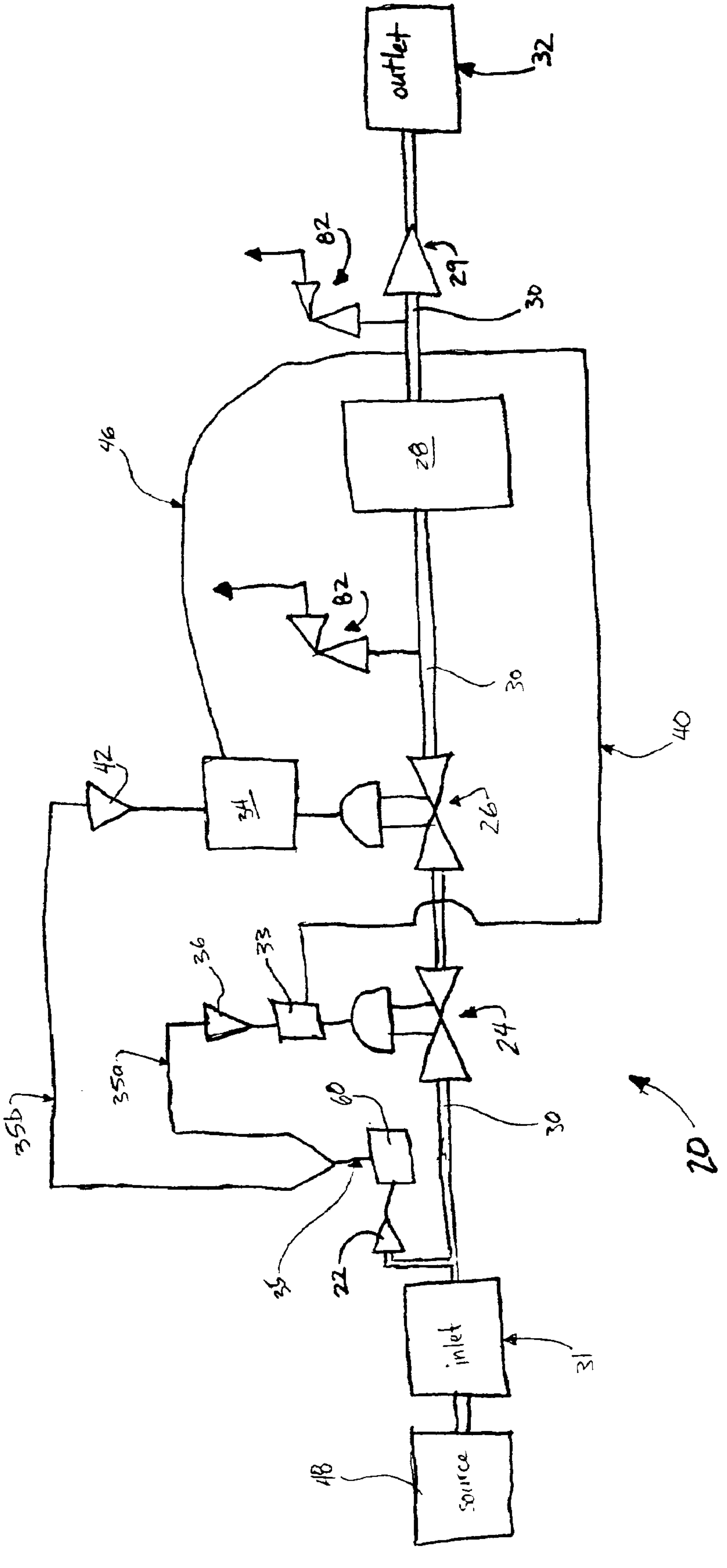
FIG. 1 is a schematic representation of one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein, being contemplated as would normally occur to one skilled in the art to which the invention relates.

Referring now to FIG. 1, there is shown schematically a regulating station 20 according to one embodiment of the present invention. In that embodiment, station 20 includes an inlet regulator 22, a motor valve 24, a control valve 26, a buffer tank 28, and an outlet regulator 29. Inlet regulator 22 is in a pilot line, as discussed below. Motor valve 24, control valve 26, buffer tank 28 and outlet regulator 29 are placed along a flow line 30, which in a specific embodiment is designed for conducting flow of natural gas. Accordingly, in the illustrated embodiment the flow of gas in flow line 30 passes each of motor valve 24, control valve 26, buffer tank 28, and outlet regulator 29. An inlet 31 to allow gas to enter station 20 from an external source and an outlet 32 to allow gas to exit station 20 and enter a customer's equipment are also provided in flow line 30.

Inlet regulator 22, in one embodiment, is a standard flow regulator designed to step down pressure in a flow line. Most preferably, inlet regulator 22 is capable of receiving gas at pressures of approximately 3000 psi, and reducing that pressure and discharging the gas at approximately 100 psi. It will be understood that these pressure ranges, and consequently the specifications of inlet regulator 22, will vary according to the use to which regulating station 20 is put. For example, if the maximum incoming pressure of natural gas or other gas into station 20 is only 500 psi, then an inlet regulator 22 rated for that maximum can be used. In one specific embodiment, inlet regulator 22 may be a type 1301 regulator, manufactured by Fisher Controls Division of Emerson Electric, Inc. (hereafter "Fisher").

Motor valve 24 is downstream of inlet 31 in flow line 30, as shown in the embodiment of FIG. 1. Motor valve 24 operates to open and close flow line 30 according to pneumatic (i.e. pressure) inputs. As will be described further below, motor valve 24 is initially in a biased-closed state (i.e. pressure opening), and is connected to a pilot 33 that provides pilot gas at a sufficient pressure to open motor valve 24. Pilot 33 senses downstream pressure in flow line 30. When such downstream pressure exceeds a predetermined maximum, pilot 33 causes the pilot gas pressure to decrease. As that pilot pressure decreases, motor valve 24 closes at least partially, and when the pilot pressure is insufficient to open motor valve 24, motor valve 24 returns to its biased-closed position, blocking flow in flow line 30. When downstream pressure in flow line 30 is below the predetermined maximum, pilot 33 passes the full pilot pressure (24 psi in one embodiment) to motor valve 24, which then opens motor valve 24 to allow more flow through flow line 30. In one specific embodiment, motor valve 24 is a type 4150 FMT PB 600RF 4IV sold by Kimray, Inc., and pilot 33 is a model 150 PG Kimray pilot.

Control valve 26, in the illustrated embodiment, is downstream of motor valve 24 along flow line 30. Control valve 26 is biased-closed, like motor valve 24, and generally operates in an analog sense, opening and closing to varying degrees in response to pneumatic inputs. For example, if the downstream pressure in flow line 30 rises above a predetermined maximum, control valve 26 is closed. As the downstream pressure reduces, control valve 26 opens to allow additional gas through flow line 30. As the downstream pressure fluctuates, control valve 26 increases or reduces flow as appropriate with the goal of maintaining an approximately steady downstream pressure. In one specific embodiment, control valve 26 may be a type 357 control valve manufactured and sold by Fisher. In that embodiment, a controller 34 is preferably provided for control valve 26. Controller 34 senses downstream pressure and sends a signal that causes control valve 26 to open or allows it to close, as appropriate. Controller 34 may be, as one example, a pneumatic controller such as the type 4150 manufactured by Fisher, and would thus send pneumatic signals to control valve 26.

Buffer tank 28 is downstream of control valve 26 along flow line 30 in the illustrated embodiment. Buffer tank 28 has a volume substantially larger than that of flow line 30 between control valve 26 and second regulator 29, and contains gas at the same pressure as the section of flow line 30 to which it is connected. Accordingly, in some embodiments of the present invention, buffer tank 28 acts as an accumulator in stabilizing the pressure in flow line 30. In some embodiments, it provides a volume for heat exchange. Further, buffer tank 28 provides dampening of pressure fluctuations, allowing more stable sensing of pressure in flow line 30, as will be described more fully hereafter. In one specific embodiment, buffer tank 28 is a model F1X-300T made by FilterFab Manufacturing Corporation. That model has the approximate shape of a cylinder about 22 inches in height and about 2.75 inches in radius, and thus has a volume of approximately 522 cubic inches, and is rated for pressures of approximately 300 psi. One of ordinary skill will understand that other buffer tanks of different volumes can also be used. Buffer tank 28 may also include a filter, as is known in the art, to screen out solids or liquids in buffer tank 28 or flow line 30. In that embodiment, buffer tank should also include a drain 28*a* or similar opening to enable removal of such contaminants.

Outlet regulator 29, as shown in the illustrated embodiment, is connected to flow line 30 downstream of buffer tank 28. Outlet regulator 29 is set to receive the gas in flow line 30 and to reduce the pressure of the gas to the level required by the customer's equipment. In one specific embodiment, second regulator 29 may receive gas at a pressure of between 100 and 200 psi, and reduce the pressure as required. Outlet regulator 29 may be a type 627 regulator manufactured by Fisher. Outlet regulator 29 then feeds gas to outlet 32 for transfer to a customer.

As indicated above, the illustrated embodiment of the invention includes sensing and control devices (e.g. pilot 33 and controller 34) for sensing pressure along flow line 30 and controlling the operation of motor valve 24 and control valve 26. These devices are preferably pneumatic, requiring no electricity to operate, and can be connected to other parts of regulating station 20 as follows. Referring again to FIG. 1, there is shown a pilot line 35, which leads from an outlet of inlet regulator 22. Pilot line 35 has two branches 35*a* and 35*b*. Pilot line 35*a* connects to a regulator 36, which in a specific embodiment steps pressure down from the approximately 100 psi from the outlet of inlet regulator 22 down to a pressure of about 24 psi. Regulator 36 may be a type 64 regulator made by Fisher. From regulator 36, pilot line 35*a* then leads to pilot 33, which as described above acts as a control for motor valve 24. Pilot 33 is connected by a line 40 to flow line 30, by which the pressure in flow line 30 is transmitted to pilot 33. In this way, pilot 33 senses the pressure in flow line 30. Pilot 33 reduces pressure passed to motor valve 24 when the sensed pressure is above a predetermined maximum, and supplies sufficient pilot pressure to open motor valve 24 when the pressure is below the predetermined maximum. As noted above, motor valve 24 is a pressure-opening valve (i.e. its normal unpressured state is closed, blocking flow line 30) unless pilot gas of sufficient pressure from pilot line 35*a* or other gas provides force to open motor valve 24. Thus, when pilot 33 senses that the downstream pressure in flow line 30 is below a predetermined maximum, pilot 33 provides proper pilot pressure to open motor valve 24. Conversely, if the sensed pressure in flow line 30 is over the predetermined maximum, pressure through pilot 33 is reduced, and motor valve 24 reverts to its normal biased-closed position, blocking flow through flow line 30.

Pilot line 35*b* extends through a regulator 42, which steps pressure down from the about 100 psi from inlet regulator 22, to a level acceptable to pneumatic controller 34. In a specific embodiment, regulator 42 may be a type 64 regulator made by Fisher. Controller 34 is connected via line 46 to flow line 30 so as to be able to sense the pressure in flow line 30. In the illustrated embodiment, line 46 connects to flow line 30 at approximately the same point as line 40. As discussed above, controller 34 controls control valve 26 based on that sensed pressure. For example, if the pressure in flow line 30 is above a predetermined maximum, controller 34 reacts to cause control valve 26 to reduce the flow in flow line 30. Conversely, as the sensed pressure in flow line 30 decreases, controller 34 reacts to open control valve 26 to increase flow until a desired and/or predetermined maximum pressure is attained in flow line 30.

Regulating station 20 according to the invention is used as follows. Regulating station 20 is connected at its inlet 31 to a gas source 48. In a preferred embodiment, regulating station 20 is designed to regulate natural gas flow from a CNG tank which may be aboard a truck, boat or other conveyance. In such tanks, pressure can begin as high as 3000 psi and will decrease as gas is unloaded through regulating station 20 to the customer. It will be understood that embodiments of the invention can be created to provide for flow of other gases. For ease of description, however, flow of natural gas through regulating station 20 will be described.

The gas enters regulating station 20 through a high-pressure flexible hose (not shown) connected to inlet 31, and moves into flow line 30 and to inlet regulator 22. Inlet regulator 22 cuts the pressure of the gas from as high as 3000 psi to approximately 100 psi. From inlet regulator 22, gas at approximately 100 psi is provided to pilot line 34. When not blocked by motor valve 24 or control valve 26, gas flows along flow line 30 to outlet regulator 29. Outlet regulator 29 cuts the pressure in flow line 30 to the pressure needed by the customer's gas-using equipment, and from outlet regulator 29 the gas exits regulating station 20 through outlet 32 and enters the customer's equipment (not shown).

As indicated above, motor valve 24 is operated by pressure sensing pilot 33, that receives pilot gas at a specified pressure from inlet regulator 22 via regulator 42. As indicated above, motor valve 24 is biased (e.g., spring-loaded) in a normally closed position. Thus, unless acted upon by pilot gas from pilot 33, motor valve 24 blocks flow line 30. Pilot 33 senses pressure in flow line 30. If such downstream pressure goes higher than the predetermined setting on the pilot 33, pilot 33 reduces the pilot gas pressure to motor valve 24. For example, in one embodiment pilot 33 may be set to reduce pilot pressure sufficiently to close motor valve 24 entirely when the downstream pressure in flow line 30 exceeds 200 psi. Without sufficient pilot gas pressure from pilot 33, motor valve 24 closes to block flow line 30, stopping the supply of gas to the customer from the CNG tank.

Control valve 26 is actuated by controller 34 as indicated above. Controller 34 senses the pressure in flow line 30 and causes control valve 26 to open or close as pressure in flow line 30 drops or rises respectively. In one specific embodiment, motor valve 24 closes if the pressure in buffer tank 28 goes above 200 psi, and control valve 26 is set to maintain a pressure of about 150 psi in buffer tank 28 and the part of flow line 30 between buffer tank 28 and outlet regulator 29. If control valve 26 allows the pressure in flow line 30 to exceed 200 psi, for example if the customer's demand quickly shrinks to zero, pilot 33 senses that pressure and drops the pilot pressure, resulting in the closure of motor valve 24. When buffer tank pressure is above 200 psi, controller 34 causes control valve 26 to close as well. When the pressure in buffer tank 28 and flow line 30 decreases below 200 psi, for example due to gas usage downstream, motor valve 24 opens. However, control valve 26 remains closed until the pressure decreases to 150 psi, i.e. the level control valve 126 is to keep flow line 130. At that point, control valve 26 reopens and undergoes adjustments as described above, working toward maintaining 150 psi downstream pressure in buffer tank 28 and flow line 30. In the preferred embodiment, motor valve 24 is able to close more quickly than control valve 26 when the downstream pressure rises.

The illustrated embodiment of regulating station 20 also includes a buffer tank 60 connected in pilot line 35. Buffer tank 60 includes a volume of gas (approximately one liter in a specific embodiment) that enables proper downstream pressure sensing and operation of inlet regulator 22, and also assists in heat exchange and in reducing or preventing sudden, erratic or rapid pressure swings in line 35. The gas in buffer tank 60 reduces or eliminates such pressure swings and the potential for oscillation by first regulator 22 while supplying pilot gas to controller 34.

Figure 2:
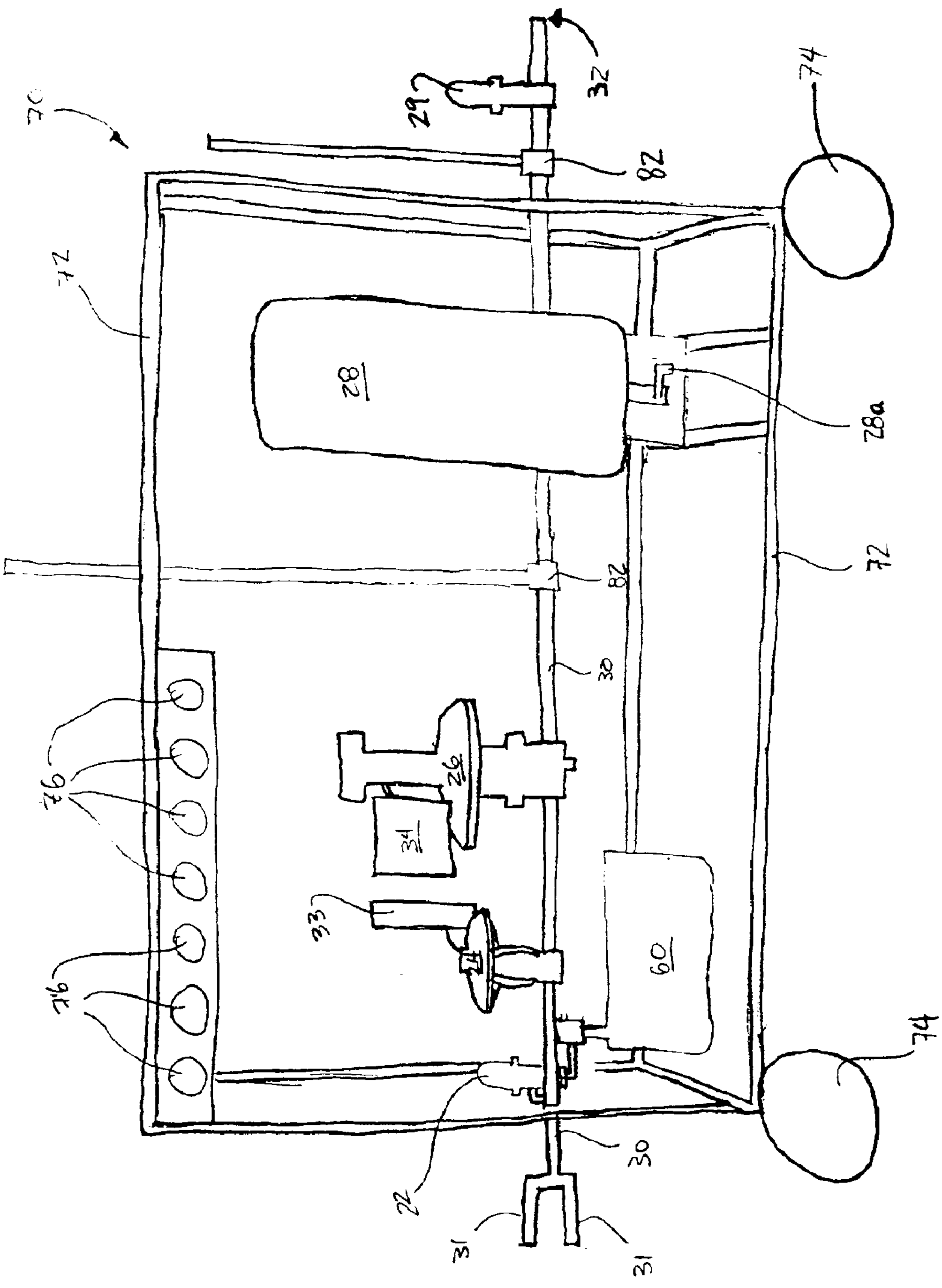
FIG. 2 is a side view of parts of the embodiment of FIG. 1 mounted on a portable cart.

Referring now to FIG. 2, there is shown a portable cart 70 in or on which all components of regulating station 20 can be fitted. For clarity of illustration in FIG. 2, not all lines and parts of the embodiment of station 20 described above are shown. Cart 70, in the illustrated embodiment, includes a frame 72 and wheels 74. Gauges 76 may also be attached to cart 70. Inlets 31 and outlet 32 extend from cart 70 to enable connection to a gas source and customer equipment, respectively. It will be understood that gauges 76 are connected to various parts of regulating station 20 so as to tell an operator at a glance the operating conditions concerning various parts of regulating station 20. For example, a gauge 76 may be connected so as to reflect the pressure in buffer tank 28, flow line 30, the pressure coming into inlet regulator 22 from the external source, the gas pressure at outlet 32, or at other places. Because of its portability, cart 70 and station 20 can be moved to accommodate new sources of gas or new equipment of a given customer, or it can be moved to different sites to service different customers. Depending on the places and conditions under which station 20 is used, cart 70 may include other appropriate mobility-providing devices, such as skids, casters, rollers, or similar apparatus, in addition to or instead of wheels 74. It will be understood that conveyances other than cart 70 can be used to provide mobility for station 20.

In one embodiment of regulating station 20, multiple inlets 31 and/or outlets 32 may be provided, and may include shut-off valves as will be appreciated by one of skill in the art. In this way, multiple gas sources may be connected to inlets 31 of station 20, so that gas flow can be easily discontinued from one source and begun from a second source, or a second source can be turned on when a primary source is empty. Multiple gas-using equipment could be connected to station 20 when provided with multiple outlets 32. Inlet 31 and outlet 32 may also include flexible hose connections, which further improves the portability and usefulness of regulating station 20. However, it will be seen that non-flexible connections, i.e. standard metal, plastic or other piping or couplings, can connect inlet 31 to a gas source or outlet 32 to a customer's equipment.

Although certain devices have been indicated above as forming a part of a preferred embodiment of the present invention, the scope of the invention should not be limited thereto. For example, regulators or similar devices with other specifications or made by other manufacturers may be used. Further, as described above a preferred embodiment of the present invention is all pneumatic, i.e., it operates without electricity. Thus, that embodiment can be used regardless of whether there are electric lines, batteries or other electric power sources available. Use of electric components in place of or in conjunction with the apparatus described above is nonetheless considered to be within the scope of the present invention. Further, other apparatus may be included in regulating station 20. For example, known electric or pneumatic metering devices for measuring gas flow or amount of gas that has been delivered may be connected to flow line 30. Additionally, as shown in FIG. 1, one or more relief valves 82 or other common pneumatic elements may be included. Relief valve 82 is a valve for releasing gas to atmosphere to counteract a buildup of pressure in case of a failure of motor valve 24 and control valve 26 to close flow line 30. Relief valve 82 should be set so as to open only when pressure in flow line 30 exceeds the value(s) under which motor valve 24 and control valve 26 should close. In an embodiment as described above, in which motor valve closes when the pressure in flow line 30 reaches 200 psi, relief valve(s) 82 could be set to open when such pressure exceeds 300 psi.

Figure 3:
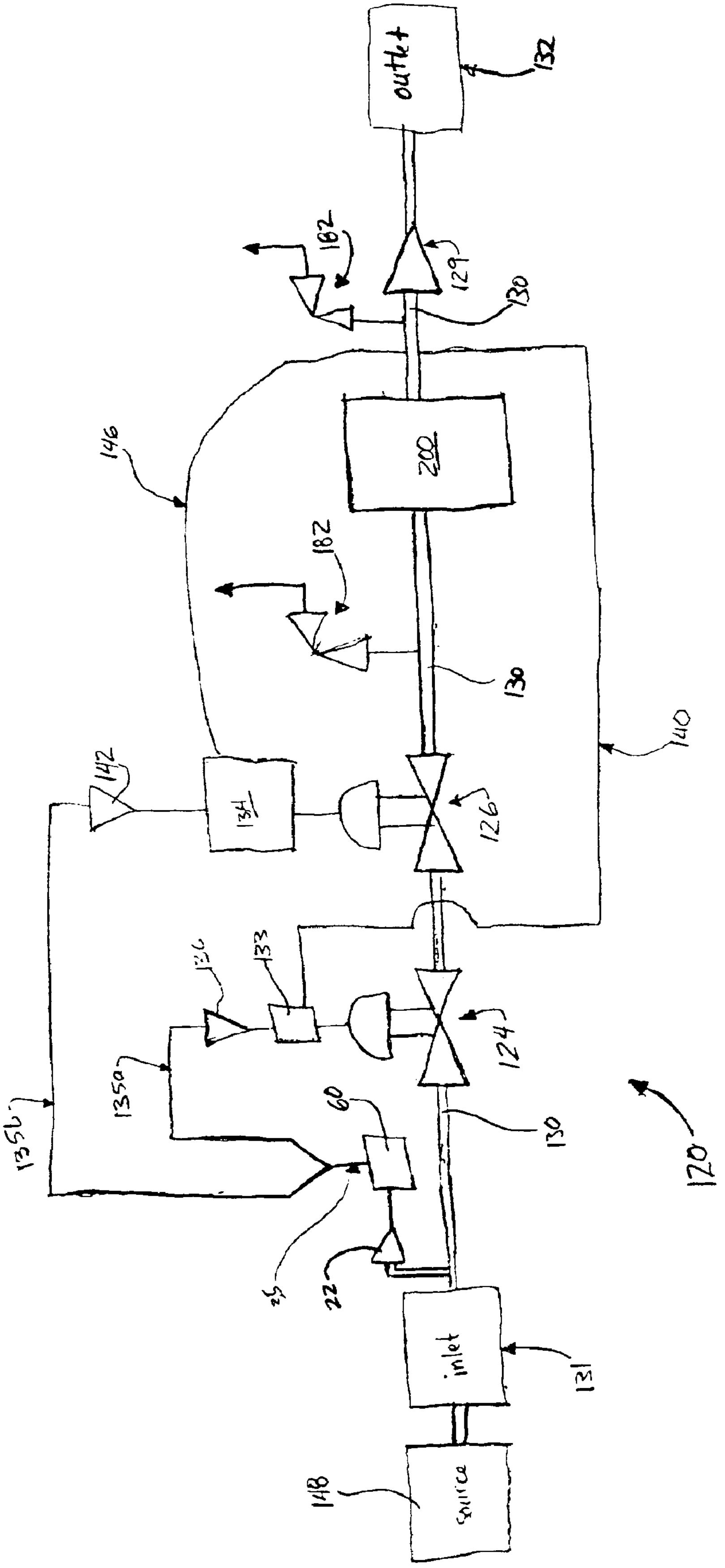
FIG. 3 is a schematic representation of another embodiment of the present invention.

Referring now to FIG. 3, there is shown schematically a regulating station 120 according to another embodiment of the present invention. Regulating station 120 is very similar to regulating station 20, described above. For ease of description, parts of regulating station 120 are numbered as 100 plus the number of the corresponding part of regulating station 20. Regulating station 120, like station 20 described above, includes an inlet regulator 122, a motor valve 124, a control valve 126, and a outlet regulator 129. Regulating station 120 also includes a line heater 200. Inlet regulator 122 is in a pilot line, and motor valve 124, control valve 126, buffer tank 128 and outlet regulator 129 are placed along a flow line 130, which in a specific embodiment is designed for conducting flow of natural gas. Accordingly, in the embodiment of FIG. 3 the flow of gas in flow line 130 passes each of motor valve 124, control valve 126, line heater 200, and second regulator 129. An inlet 131 to allow gas to enter station 120 from an external source and an outlet 132 to allow gas to exit station 120 and enter a customer's equipment are also provided in flow line 130.

In this embodiment, all of inlet regulator 122, motor valve 124, control valve 126, second regulator 129, inlet 131 and outlet 132 can be the same apparatus and generally operate in the same way as their counterparts described above with respect to station 20. Further, as shown in FIG. 3 station 120 includes sensing and control devices (e.g. pilot 133 and controller 134) for sensing pressure along flow line 130 and controlling the operation of motor valve 124 and control valve 126. These devices are in one embodiment the same as pilot 33 and controller 34 described above, and operate with pilot lines 135*a* and 135*b*, regulators 136 and 142, lines 140 and 146, and gas source 148 as generally described above.

Figure 3A:
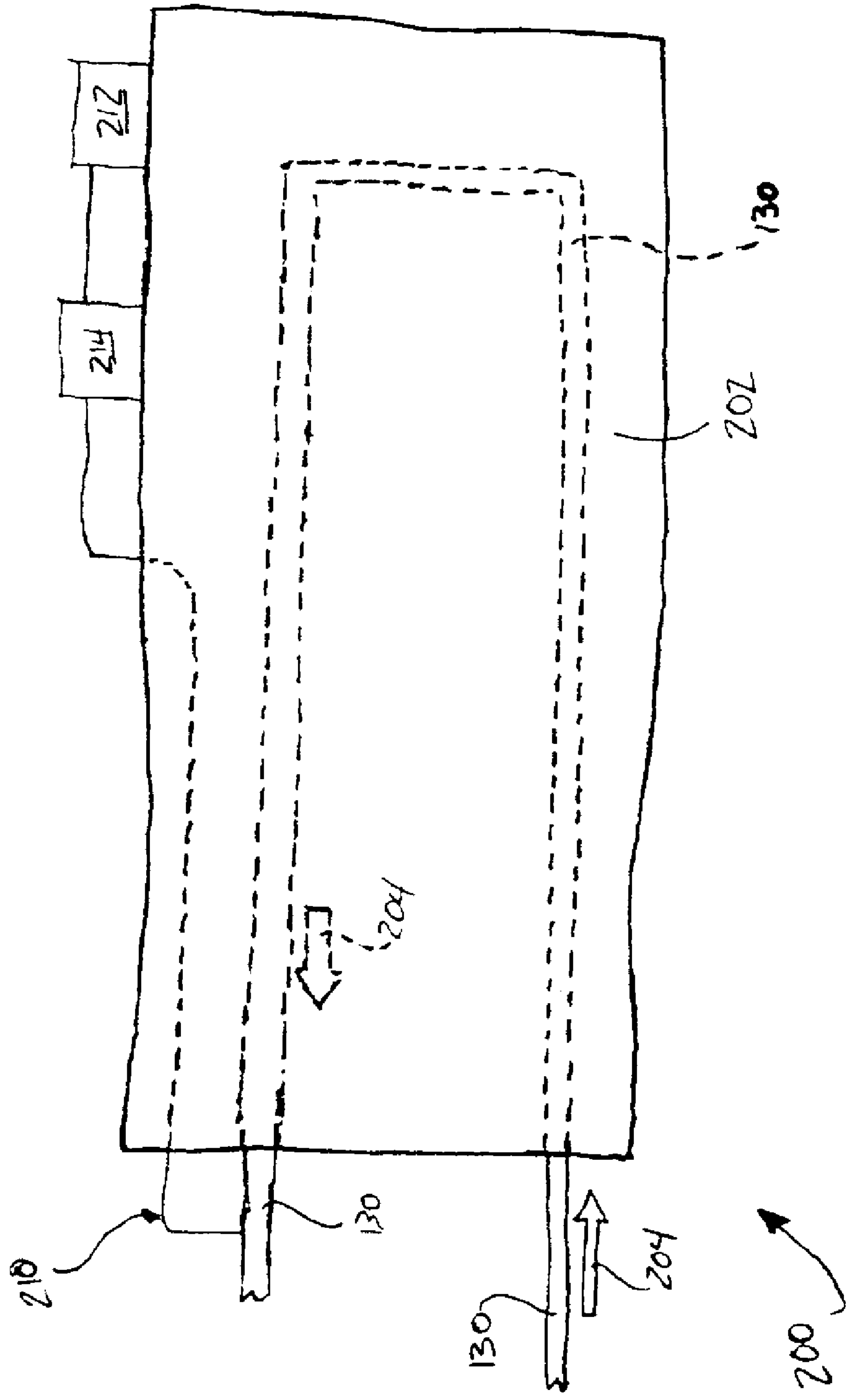
FIG. 3*a* is a schematic representation of parts of the embodiment of FIG. 3.

In the embodiment of FIG. 3, line heater 200 includes a tank 202 filled with a heat-exchanging medium such as water located downstream of motor valve 124 and control valve 126. Flow line 130 enters tank 202, so that the heat exchanging medium substantially surrounds a portion of flow line 130, then flow line 130 exits tank 202. In FIG. 3*a*, the flow of gas is indicated by arrows 204. In a specific embodiment, flow line 130 is a two-inch line throughout the embodiment. Thus, for the volume of flow line 130 inside of tank 202 to be approximately equal to the volume of buffer tank 28 (described above), the length of flow line 130 within tank 202 is about 166 inches. Tank 202 provides for heat exchange to address the cooling of the gas as pressure is reduced, and the extended flow line 130 provides the volume of gas in flow line 130 that dampens pressure fluctuations and enables stable pressure sensing by pilot 133 and controller 134.

Referring again to FIG. 3, line heater 200 can include apparatus for warming the heat exchanging medium within tank 202. In the embodiment in which station 120 is used with natural gas, a fuel gas line 210 branches from flow line 130. In a particular embodiment, line 210 runs through tank 202 to a burner 212. Burner 212 is associated with tank 202 as is well-known to heat the heat exchanging medium within tank 202. Additional valves, regulators, or other known devices may be placed in line 210 to facilitate proper flow and delivery of gas, as is known in the art. A temperature controller 214 may also be included, which monitors temperature in the heat exchanging medium and adjusts gas flow to burner 212 so as to keep the temperature of the heat exchanging medium within a range. It will be observed that in embodiments of the invention that are not used for natural gas transfer, an alternative fuel source and/or an alternative heating element may be provided. For example, instead of burner 212, an electric, chemical, or other type of heating element could provide heat to tank 202, or an alternative natural gas source may be connected to burner 212.

Gas enters regulating station 120 through a high-pressure flexible hose (not shown) connected to inlet 131 and moves into flow line 130 and to inlet regulator 122. Inlet regulator 122 cuts the pressure of the gas from as high as 3000 psi to approximately 100 psi. From inlet regulator 122, gas at approximately 100 psi is provided to pilot line 134. When not blocked by motor valve 124 or control valve 126, gas flows along flow line 130 to outlet regulator 129. Outlet regulator 129 cuts the pressure in flow line 130 to the pressure needed by the customer's gas-using equipment, and from outlet regulator 129 the gas exits regulating station 120 through outlet 132 and enters the customer's equipment (not shown).

Motor valve 124 is operated by pressure sensing pilot 133, that receives pilot gas at a specified pressure from inlet regulator 122 via regulator 142. Motor valve 124 is biased (e.g., spring-loaded) in a normally closed position. Thus, unless acted upon by pilot gas from pilot 133, motor valve 124 blocks flow line 130. Pilot 133 senses pressure in flow line 130 via line 140 connected downstream of tank 202. If such downstream pressure goes higher than the predetermined setting on the pilot 133, pilot 133 reduces the pilot gas pressure to motor valve 124. For example, in one embodiment pilot 133 maybe set to reduce pilot pressure to a level insufficient to open motor valve 124 when the downstream pressure in flow line 130 exceeds 200 psi. Without sufficient pilot gas pressure from pilot 133, motor valve 124 closes to block flow line 130, stopping the supply of gas to the customer from the CNG tank.

Control valve 126 is actuated by controller 134. Controller 134 senses the pressure in flow line 130 and causes control valve 126 to open or close as pressure in flow line 130 drops or rises respectively. Controller 134 senses the pressure at a point in flow line 130 downstream from tank 202, and in one embodiment the pressure-sensing point for controller 134 is approximately the same as that for pilot 133. In a specific embodiment, motor valve 124 is set to close if the pressure in flow line 130 between tank 202 and outlet regulator 129 goes above 200 psi, and control valve 126 is set to maintain a pressure of about 150 psi in that part of flow line 130. If control valve 126 allows the pressure in flow line 130 to exceed 200 psi, for example if the customer's demand quickly shrinks to zero, pilot 133 senses that pressure and drops the pilot pressure, resulting in the closure of motor valve 124. When downstream flow line pressure is above 200 psi, controller 134 causes control valve 126 to close as well. When downstream flow line pressure decreases below 200 psi, for example due to gas usage downstream, motor valve 124 opens. However, control valve 126 remains closed until the pressure decreases to 150 psi, i.e. the level control valve 126 is to keep flow line 130. At that point, control valve 126 reopens and undergoes adjustments as described above, working toward maintaining 150 psi downstream pressure in flow line 130. In the preferred embodiment, motor valve 24 is able to close more quickly than control valve 26 when the downstream pressure rises.

The illustrated embodiment of regulating station 120 also includes a buffer tank 160 connected in pilot line 135. Buffer tank 160 includes a volume of gas that enables proper downstream pressure sensing and operation of inlet regulator 122, and also assists in heat exchange and in reducing or preventing sudden, erratic or rapid pressure swings in line 135. The gas in buffer tank 160 reduces or eliminates such pressure swings and the potential for oscillation by inlet regulator 122 while supplying pilot gas to controller 134.

Figure 4:
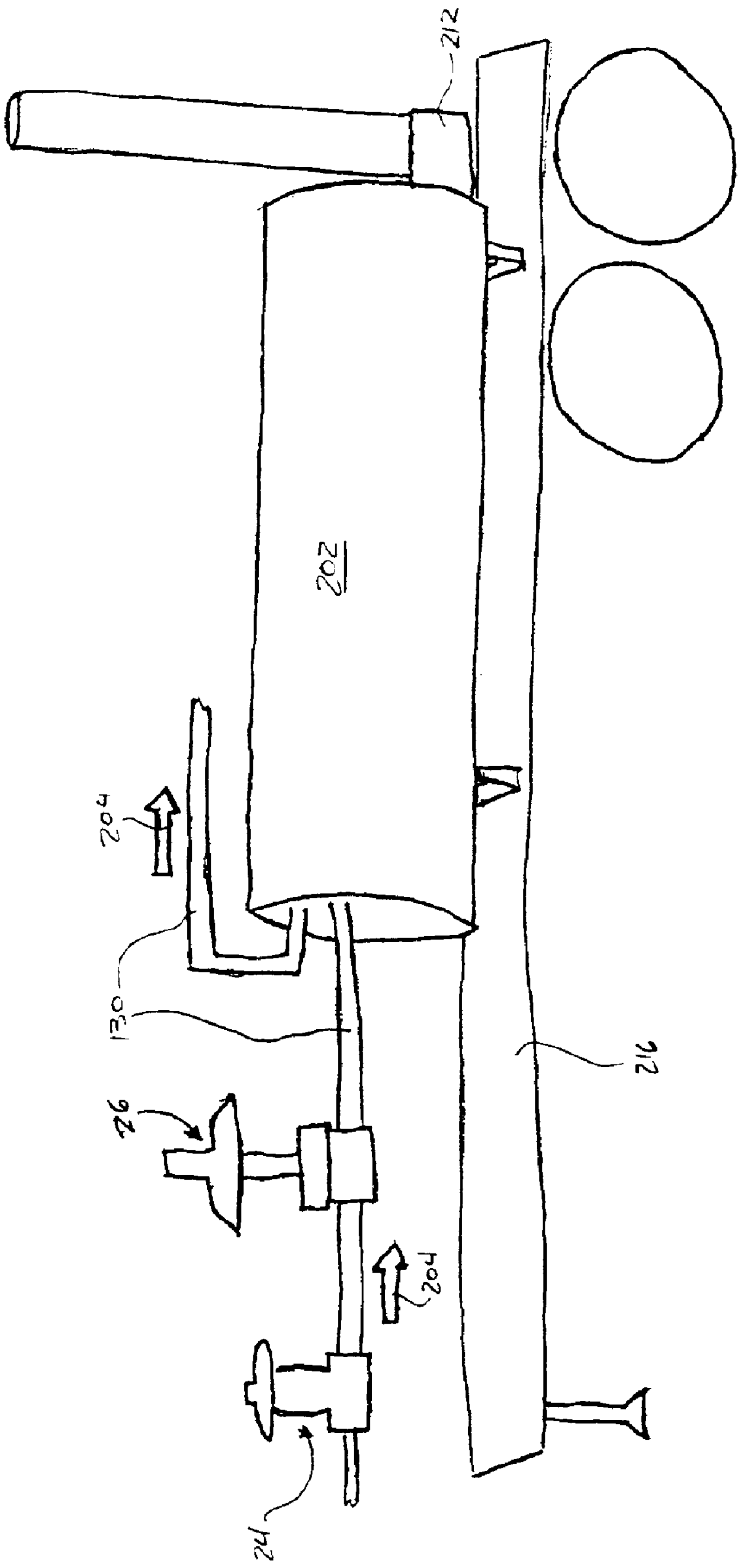
FIG. 4 is a side view of parts of the embodiment of FIG. 3 mounted on a portable surface.
Figure 1:
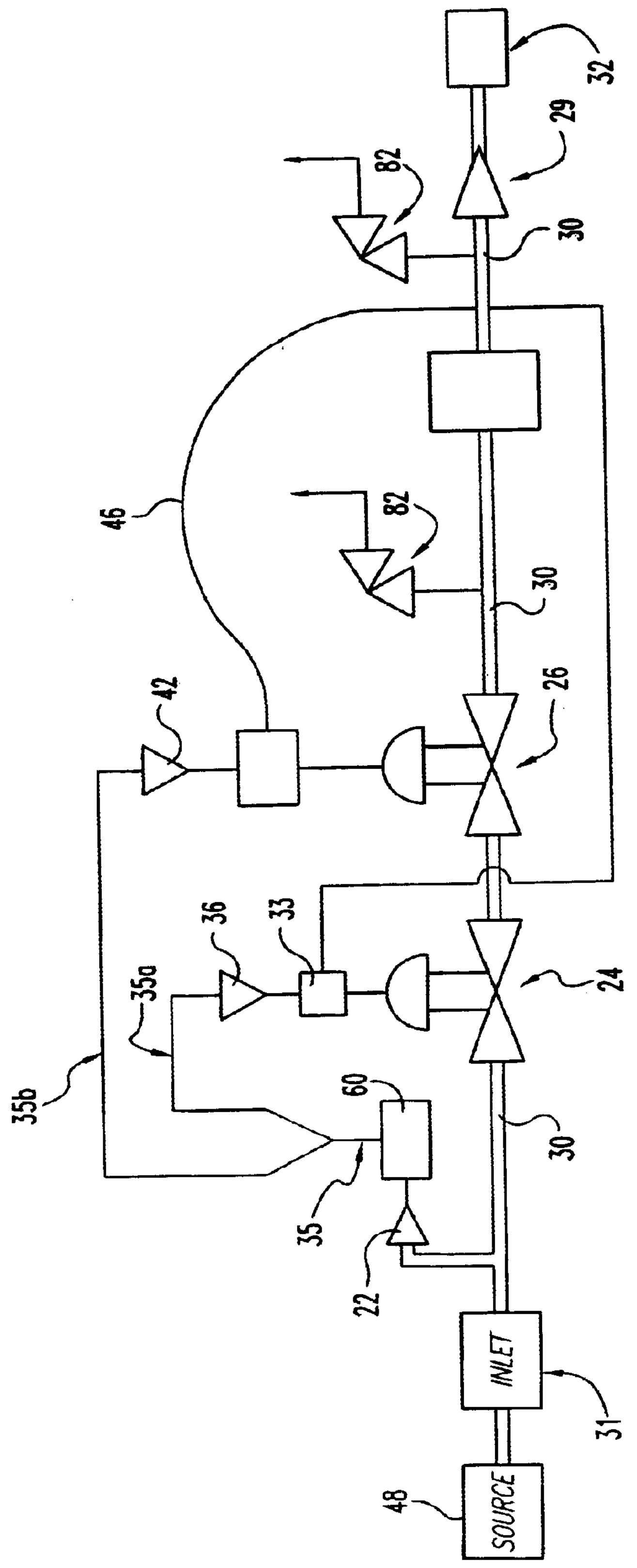
Figure 2:
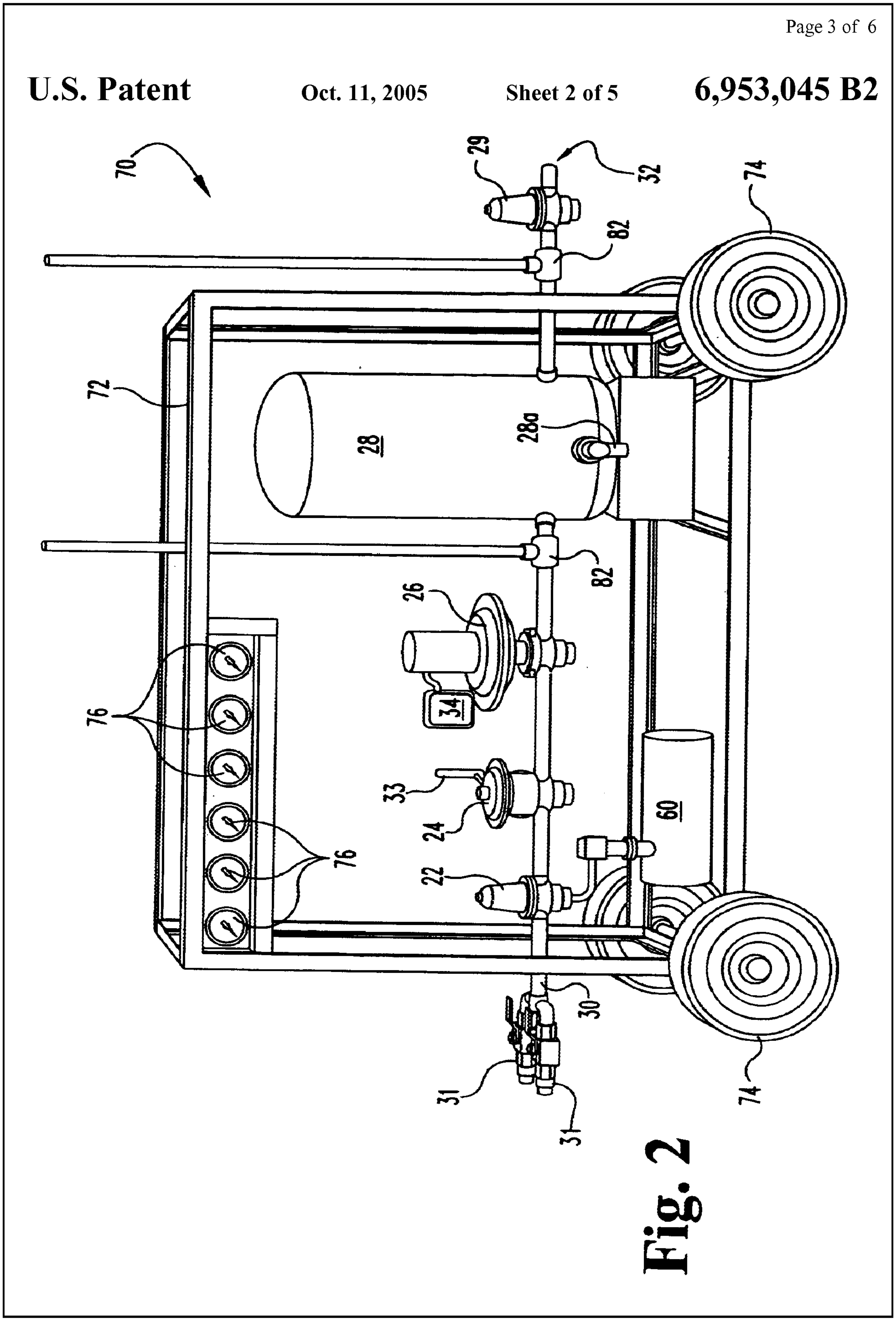
Figure 3:
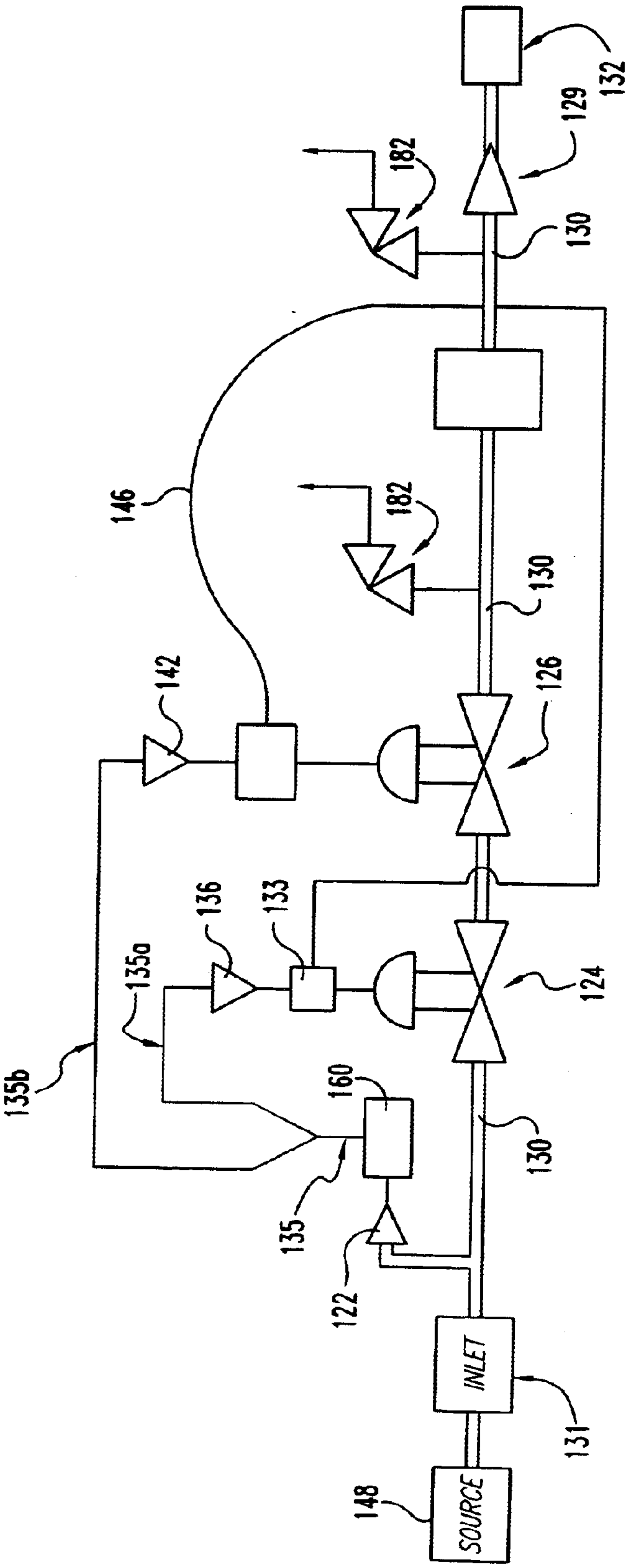
Figure 3A:
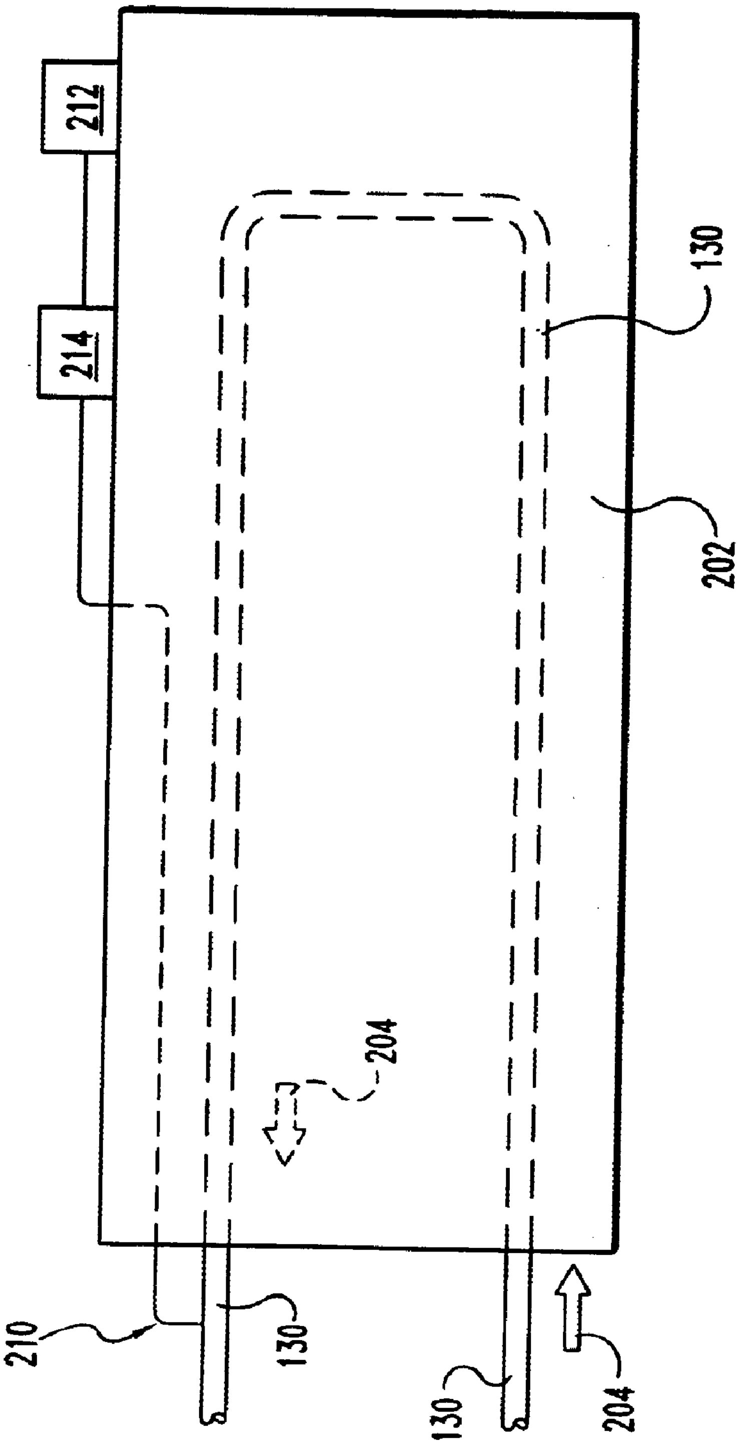
Figure 4:
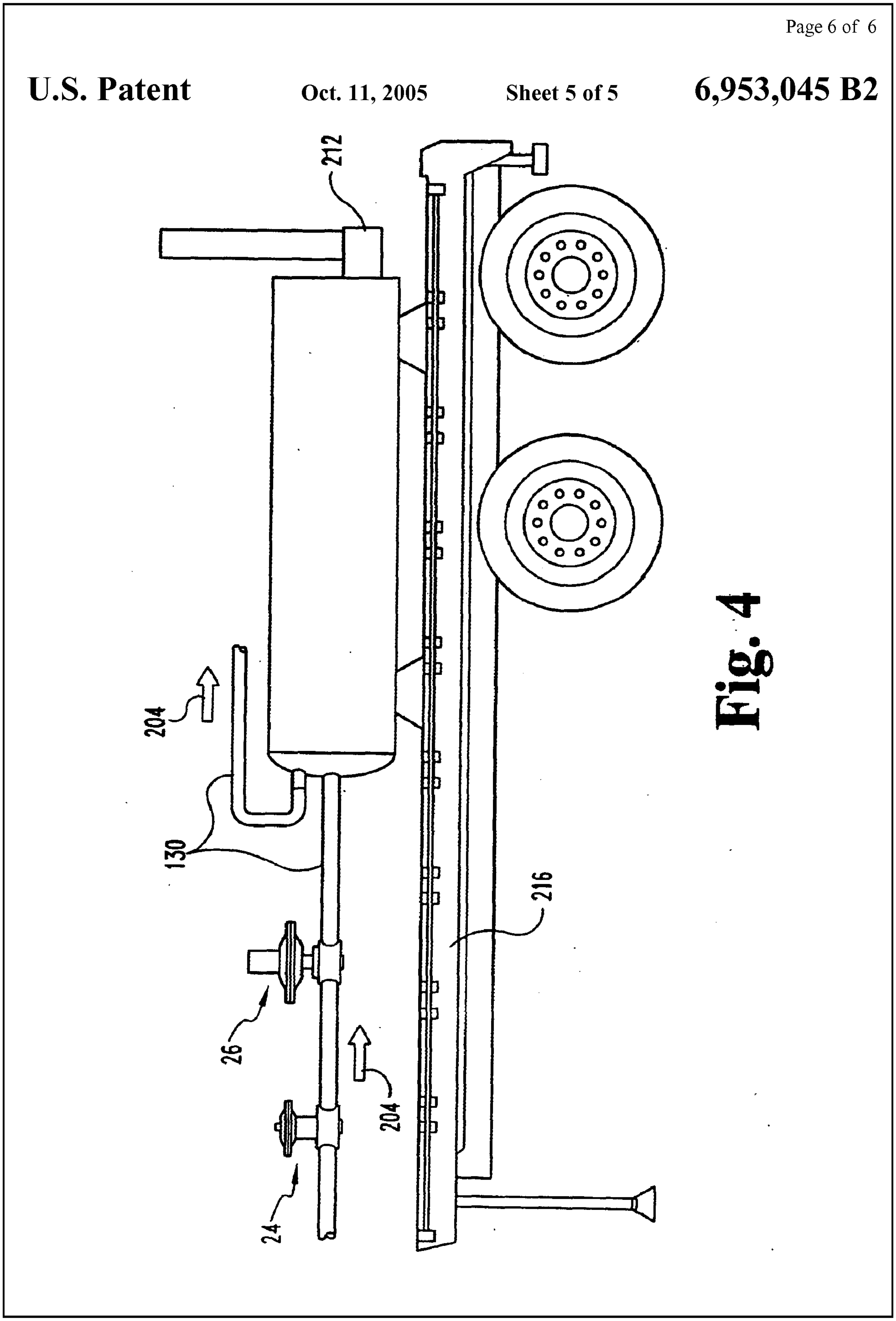

Regulating station 120 is also portable in a preferred embodiment. As shown in FIG. 4, Tank 202 (with a portion of flow line 130 inside) may be mounted atop a truck bed 216, such as a semi tractor-trailer bed, or other conveyance. The remaining parts of station 120 can be connected to flow line 130 and tank 202 as indicated above and in FIGS. 3, **3*a* and 4, and may be anchored to or supported by the conveyance. The conveyance may be wheeled, as shown, or may include other appropriate mobility-providing devices, such as skids, casters, rollers, or similar apparatus, in addition to or instead of wheels. Thus, station 120** may be moved to service multiple sites, sources of gas, or equipment.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:

a gas flow line including a motor valve, a control valve, and an outlet regulator, said gas flow line having sufficient volume for stable pressure sensing;

a controller for controlling operation of said control valve;

an inlet regulator;

a first pilot line connecting said inlet regulator to said motor valve;

a second pilot line connecting said inlet regulator to said controller;

a relief valve connected to said gas flow line at a point downstream of said motor valve and said control valve;

said controller being connected via a third line to said gas flow line, and said motor valve being connected via a fourth line to said gas flow line, wherein said third and fourth lines hold gas under pressure in order to sense the pressure in said gas flow line, whereby said controller and said motor valve make adjustments in response to pressure fluctuations via said third and fourth lines to maintain the pressure in said gas flow line at or below a predetermined maximum.

2. The apparatus of claim 1 wherein said volume of said gas flow line is provided by extending said gas flow line through a tank, said tank including an amount of heat exchanging fluid.

3. The apparatus of claim 2, further comprising a conveyance holding said apparatus from the group consisting of land vehicles and water vehicles.

4. The apparatus of claim 3 further comprising at least one inlet and at least one outlet connected to said gas flow line.

5. The apparatus of claim 4, wherein said inlet is adapted to connect to a high-pressure source of gas.

6. The apparatus of claim 4 further comprising at least one flexible hose, said hose connected to either one of said at least one inlet or one of said at least one outlet.

7. The apparatus of claim 1 further comprising a meter connected to said gas flow line.

8. The apparatus of claim 1 further comprising a buffer tank connected between said inlet regulator and said first and second pilot lines.

9. The apparatus of claim 1 wherein said inlet regulator, said motor valve, said control valve, said outlet regulator and said controller do not require electricity to function.

10. The apparatus of claim 1 wherein said volume of said gas flow line is provided in part by a buffer tank connected to said gas flow line.

11. The apparatus of claim 10, further comprising a conveyance holding said apparatus from the group consisting of land vehicles and water vehicles.

12. The apparatus of claim 11 further comprising at least one inlet and at least one outlet connected to said gas flow line.

13. The apparatus of claim 12, wherein said inlet is adapted to connect to a high-pressure source of gas.

14. The apparatus of claim 12 further comprising at least one flexible hose, said hose connected to either one of said at least one inlet or one of said at least one outlet.

15. The apparatus of claim 10 further comprising a meter connected to said gas flow line.

16. The apparatus of claim 10 further comprising a buffer tank connected between said inlet regulator and said first and second pilot lines.

17. The apparatus of claim 10 wherein said inlet regulator, said motor valve, said control valve, said second regulator and said controller do not require electricity to function.

18. An apparatus comprising:

a gas flow line including a motor valve, a control valve, a means for heat exchange, and a outlet regulator;

a controller for controlling operation of said control valve;

an inlet regulator;

a first pilot line connecting said inlet regulator to said motor valve;

a second pilot line connecting said inlet regulator to said controller;

a relief valve connected to said gas flow line at a point downstream of said motor valve and said control valve;

said controller being connected via a third line to said gas flow line, and said motor valve being connected via a fourth line to said gas flow line, wherein said third and fourth lines hold gas under pressure in order to sense the pressure in said gas flow line, whereby said controller and said motor valve make adjustments in response to pressure fluctuations via said third and fourth lines to maintain the pressure in said gas flow line at or below a predetermined maximum.

19. The apparatus of claim 18 wherein said means for heat exchange includes a buffer tank connected to said gas flow line such that said buffer tank contains an amount of the same type of gas as is within said gas flow line.

20. The apparatus of claim 18 wherein said means for heat exchange includes a tank external to said gas flow line, said tank containing a heat exchange medium.

21. The apparatus of claim 20 further comprising means for heating said heat exchange medium.

22. The apparatus of claim 21, wherein said gas flow line contains natural gas, and said means for heating includes a burner connected to said gas flow line which bums a portion of said natural gas.

23. An apparatus comprising:

a gas flow line including a motor valve, a control valve, a buffer tank, and an outlet regulator;

a controller for controlling operation of said control valve;

an inlet regulator;

a first pilot line connecting said inlet regulator to said motor valve;

a second pilot line connecting said inlet regulator to said controller;

a relief valve connected to said gas flow line at a point downstream of said motor valve and said control valve;

said controller being connected via a third line to said gas flow line, and said motor valve being connected via a fourth line to said gas flow line, wherein said third and fourth lines hold gas under pressure in order to sense the pressure in said gas flow line, whereby said controller and said motor valve make adjustments in response to pressure fluctuations via said third and fourth lines to maintain the pressure in said gas flow line at or below a predetermined maximum.

24. The apparatus of claim 23, wherein said apparatus is mounted to a portable cart.

25. The apparatus of claim 24 wherein said cart includes at least one of wheels, rollers, casters and skids whereby said cart can be moved.

26. The apparatus of claim 23 further comprising a second buffer tank connected between said inlet regulator and said first and second pilot lines.

27. The apparatus of claim 23 wherein said inlet regulator, said motor valve, said control valve, said second regulator and said controller do not require electricity to function.

28. A method comprising:

connecting a motor valve, a control valve with a controller, a buffer tank, a relief valve and a regulator to a flow line, said relief valve connected to said flow line at a point downstream of said motor valve and said control valve, said controller being connected via a first line to said flow line, and said motor valve being connected via a second line to said flow line, wherein said third and fourth lines hold gas under pressure in order to sense the pressure in said flow line;

connecting a first portion of said flow line to a source of gas;

connecting a second portion of said flow line to an apparatus adapted to receive gas; and allowing gas to flow from said source of gas through said flow line to said apparatus adapted to receive gas, wherein said controller and said motor valve make adjustments in response to pressure fluctuations via said first and second lines to maintain the pressure in said flow line at or below a predetermined maximum.

29. The method of claim 28, wherein during said allowing step gas passes said motor valve, said control valve, said buffer tank, and said regulator.

30. The method of claim 28, further comprising the steps of:

sensing the pressure in said flow line; and adjusting at least one of said motor valve and said control valve in response to said sensing step.

* * * * *

CERTIFICATE OF CORRECTION

PATENT NO. : 6,953,045 B2
APPLICATION NO. : 10/119813
DATED : October 11, 2005
INVENTOR(S) : Neil Enerson It is certified that error appears in the above-identified patent and that said Letters Patent is hereby corrected as shown below:

Replace issued informal patent drawing sheets 1-5 of 5, showing FIGS. 1, 2, 3, 3a and 4, with attached formal patent drawing sheets showing FIGS. 1, 2, 3, 3a and 4.

Signed and Sealed this

Seventeenth Day of October, 2006

JON W. DUDAS
*Director of the United States Patent and Trademark Office*

UNITED STATES PATENT AND TRADEMARK OFFICE

CERTIFICATE OF CORRECTION

PATENT NO. : 6,953,045 B2
APPLICATION NO. : 10/119813
DATED : October 11, 2005
INVENTOR(S) : Neil Enerson It is certified that error appears in the above-identified patent and that said Letters Patent is hereby corrected as shown below:

In column 12, in claim 28, in line 36, delete the word "third" and replace with --first--.

In column 12, in claim 28, in line 36, delete the word "fourth" and replace with --second--.

Signed and Sealed this

Eighteenth Day of November, 2008

JON W. DUDAS
*Director of the United States Patent and Trademark Office*